June 15, 1965   F. L. NEEDHAM   3,189,509
PATCH FOR METAL PANEL
Filed Oct. 1, 1962

INVENTOR.
FRANK L. NEEDHAM
BY William A. Murray
ATTORNEY

United States Patent Office 3,189,509
Patented June 15, 1965

3,189,509
PATCH FOR METAL PANEL
Frank L. Needham, 423 23rd Ave., Moline, Ill.
Filed Oct. 1, 1962, Ser. No. 227,188
4 Claims. (Cl. 161—39)

This invention relates to a patch construction used on a rusted or dented area of a metal panel. More particularly, this invention relates to a method of patching and sealing a rusted hole against the effects of further corrosion. Still more particularly, this invention relates to a patch construction capable of being applied to both regular and irregular surfaces or surfaces that are displaced from a given plane at both uniform and non-uniform distances.

In the past it has been the practice of patching a rusted hole in, for example, an automobile body with several layers of fabric and several layers of a self-hardening resin between the fabric. Upon the resin hardening, the entire patch structure becomes rigid and may be buffed to a highly smooth surface so as to be a finish comparable to that of the remainder of the automobile. This type of patch is generally shown and described in U.S. Patent 2,795,523.

The difficulty with this type of patch is that it will not prevent the effects of further corrosion around the hole. The fabric used as well as the hardened resin remains relatively porous. Consequently, the rust around the hole will in a short time penetrate the resin and fabric and create blisters in the paint or finish on the patch. This will, of course, ruin the appearance of the patched area. Also, the rust will seep to the edge of the patch and eventually cause corrosion around the patch. This entire reaction is generally of short duration, occurring in some instances only a few months after the patch is placed on the metal. Consequently, in repair work of this nature there is conventionally no guarantee as to length of time that a patch will remain.

There are other ways of patching a hole in a car body such as enlarging the hole by cutting it and welding a replacement panel in the hole. Also, a patch may be soldered into the area of the corroded hole. However, these latter types of patch work also create problems. Primary among these is the fact both require highly skilled men to do patch work of this nature. Also, due to the surface curvature of certain parts of the automobile body, it is impossible to patch in this manner unless the patch is preformed to the curvature. It may be possible in some instances for a sheet used as a patch to be formed into a uniformly and relatively simple curved section, such as a rocker panel of most automobiles. However, there exist far more complicated surfaces in which it is entirely impossible to so form a metal sheet. Consequently, even the latter type patches are limited to the extent of their uses.

It is therefore the primary object of the invention to provide a new and novel method of applying a patch which requires very little skill and which is universal in its use in the sense it may be applied to any portion of the automobile body without preforming.

Specifically, it is the object of the invention to provide a patch of comparatively non-porous material, such as aluminum, which is also completely imperforate, to the surface to be patched. By providing such a patch, the corrosion will be blocked or will not penetrate the patch to damage the painted or finished surface on the patch.

It is a further specific object of the invention to provide a patch as described above composed of a panel with interlaced recessed rows on each surface formed by beads projecting from a relatively thin central sheet portion. Such a patch will be highly flexible and may be formed to fit any type of surface contour. This is due to the fact that the recessed rows may expand or retract to accommodate the surface to be patched.

A self-hardening adhesive is applied between the beads or in the recesses and also to the surface of the panel to be patched. Conventionally such an adhesive is a catalyzed epoxy resin. Upon hardening the flexibility is no longer present in the patch since the recesses between the beads are filled with a hardened material. The patch may then be buffed and finished comparable to the finish of the rest of the automobile.

Other objects and advantages of the present invention will become apparent as the nature of the invention is better understood from the following description and as shown in the accompanying drawings.

Figure 1:
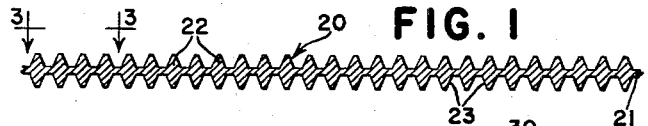
FIGURE 1 is a vertical and enlarged cross section of the patch panel.

Referring now to the drawings, the panel to be patched is, for purposes of illustration, a panel having an irregular surface such as might occur in a fender of an automobile. Generally a surface of this type may be described as one displaced from a given plane at unequal distances. The fender panel may be specifically described as having an arcuate shaped overhead portion 11 and a vertical side portion 12 interconnected by a corner or rounded portion 13. For purposes of further illustration, a rusted hole 14 is in the corner portion 13 of the fender. The present patch construction may be used for any type surface, but is particularly adapted for a surface as described above. Other such irregular surfaces occur in the hood, around the light, and numerous other areas on an automobile.

Figure 3:
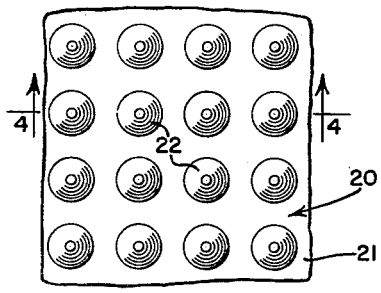
FIGURE 3 is an enlarged plan view of a portion of the panel as viewed along the lines 3—3 of FIGURE 1.
Figure 4:
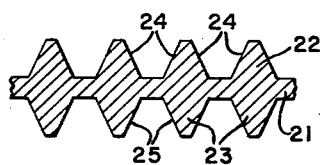
FIGURE 4 is a sectional view taken substantially along the line 4—4 of FIGURE 3.

A patching panel 20 is provided to be applied to the hole 14. The panel 20 is composed of relatively non-porous metal, such as aluminum, and is completely imperforate. The panel 20 is constructed, as illustrated in FIGURES 1, 3 and 4 of a very thin central sheet portion or layer 21 which is sufficient to retain the imperforate and non-porous condition of the patch. Conical shaped beads 22, 23 are directly opposite one another on opposite sides of the sheet section 21 and protrude from the sheet section 21. As may be seen from viewing FIGURE 3, the beads 22, 23 are disposed in rows longitudinally, transversely, and diagonally so as to form recessed rows or areas on opposite sides of the center sheet running both longitudinally, transversely and diagonally, the longitudinal rows being indicated at 24, 25 in FIGURE 4. This configuration or one giving the same characteristics is important since it provides a relatively thin imperforate central section 21 sufficiently flexible to form around the corner section 13 of the fender as well as the arcuate curvature of the overhead panel 11. As a practical matter, the over-all thickness of the patch 20 would be relatively thin and in the preferred form approximately .030 inch thick with layer 21 being about .006 inch thick and the projecting portions 22, 23 extending approximately .012 inch from the layer 21.

Figure 2:
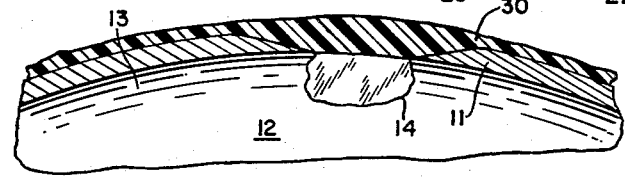
FIGURE 2 is a vertical and enlarged cross section of the panel to be patched.

In mounting the patch panel 20 on to the metal fender it is necessary that the outer surface around the opening 14 be completely cleared of rust, corrosion, dirt and moisture of any type. An epoxy or other type self-hardening metal adhesive material 30 is applied to the surface of the fender in a manner shown in FIGURE 2. It could, of course, be applied to the underside of the patch panel 20. It will be noted the epoxy generally fills the hole 14 almost to the undersurface of the fender 11. The panel patch 20 is applied to the surface and as may be seen in FIGURE 5 pressed down into the epoxy resin. This forces the epoxy into the recessed areas between the beads 23, 25 of the patch 20 as to fill the entire recessed areas. This, of course, occurs while the epoxy is in a fluid or nonhardened condition.

It should be noted that due to the shape or form of the surface excess epoxy and air bubbles may be worked to the outer edges of the patch via the recessed rows 25. Also, with the patch applied, the epoxy in the hole 14 will pass through the hole 14 and usually will form a small lip engaging the edges of the hole.

Figure 5:
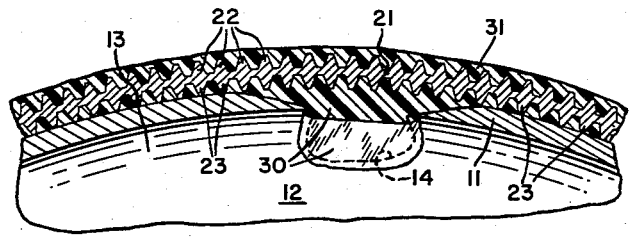
FIGURE 5 is a view similar to FIGURE 2 showing the patch applied and prior to buffing or abrading.

An outer coat 31 of epoxy or similar self-hardening solution is applied to the outer surface of the sheet 20 in sufficient quantity to fill the recessed areas 24 between the upper or outer beads 22. The layer 30 of epoxy fills the recesses 24 and generally is sufficiently applied to completely cover the outer surface of the patch 20, such as is shown in FIGURE 5.

Following hardening of the layers 30, 31 of epoxy the outer surface of the patch construction is buffed or abraded to a smooth surface. As a practical matter, the patch is buffed until the outer extremities of the beads appear. This is important because it will be visual evidence that the buffing is approaching the thin central layer 21, and, of course, that further buffing should be limited. The edges of the patch are buffed to a smooth feathered edge, such as at 32, to form a smooth juncture between the outer surface of the patch construction and the adjacent outer surface of the fender.

Figure 7:
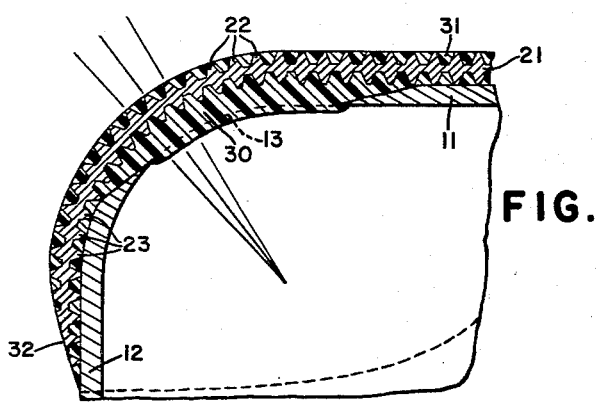
FIGURE 7 is a sectional view taken substantially along the line 7—7 of FIGURE 6.

Viewing FIGURE 7, radius lines are shown extending from a given point through the patch 20 and through the corner portion 13. As is evident, the radius lines extend through oppositely disposed beads 22, 23 on the patch 20. Also, it becomes evident that recessed rows 25 contract at the corner and the recessed rows 24 expand to accommodate the corner curvature. Upon the epoxy resin layers 30, 31 hardening, the entire patch construction hardens.

Figure 6:
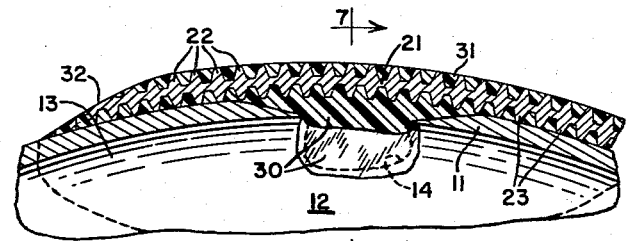
FIGURE 6 is a view similar to FIGURE 5 with patch buffed and feathered at its edge.

While not shown, the patch as shown in FIGURES 6 and 7 has applied thereto a finish coat of paint or lacquer similar to that of the automobile. The area of the fender around the original hole 14 is, of course, subject to further corrosion, and, generally will corrode simply for the reason that the conditions causing the hole 14 are also present in the surrounding area. The fact that the center layer 21 is both a non-porous and imperforate aluminum becomes important since corrosion or rust in the area around the hole 14 will not penetrate through the layer 21 and blister the paint on the patch. Also, the roughened inner surface formed by the beads 23 will tend to retard the spread of the corrosion to the outer edges of the patch.

While only one form of the invention has been shown, it should be recognized that other forms and variations will occur without departing from the principles of the invention. Therefore, while the present form has been shown in concise and detailed manner for the purpose of clearly illustrating the principles of the invention, it is not the intention to limit or narrow the invention beyond the broad concepts set forth in the appended claims.

What is claimed is:

1. A patch construction adapted for mounting on a panel having an irregular surface displaced from a given plane at non-uniform distances, comprising: a patch composed of a thin non-porous and imperforate layer with spaced apart projecting portions and recesses on opposite sides; a self-hardening adhesive material between one side of the patch and the panel to be patched, the adhesive being fluidal prior to hardening and extending into the spacing between the projecting portions; a self-hardening material on the other of the sides of the patch disposed in the spacing of its projecting portions defining therewith a generally smooth and uninterrupted surface; and a generally smooth and generally uninterrupted juncture adjacent the edge of the patch between the outer surface of the patch and the outer surface of the panel.

2. The invention defined in claim 1 further characterized by the projecting portions and the recesses being directly opposite to one another on opposite sides of the patch.

3. The invention defined in claim 1 in which the non-porous and imperforate metal layer is composed of aluminum.

4. The invention defined in claim 1 in which the layer is approximately six thousands of an inch thick and the projections on opposite sides are substantially twice the thickness of the layer.

References Cited by the Examiner

UNITED STATES PATENTS

| 1,789,030 | 1/31 | Balfe | 161—119 |
| 1,915,221 | 6/33 | Fitzgerald | 161—111 |
| 2,051,373 | 8/36 | Fitzgerald | 161—74 |
| 2,157,183 | 5/39 | Mullen. | |
| 2,573,482 | 10/51 | Peik | 161—120 |
| 2,795,523 | 6/57 | Cobb et al. | 156—94 |
| 3,109,765 | 11/63 | Petrowsky | 156—94 |
| 3,152,033 | 10/64 | Black et al. | 161—50 |

FOREIGN PATENTS 683,855  12/52  Great Britain.

EARL M. BERGERT, *Primary Examiner.*